UNITED STATES PATENT OFFICE.

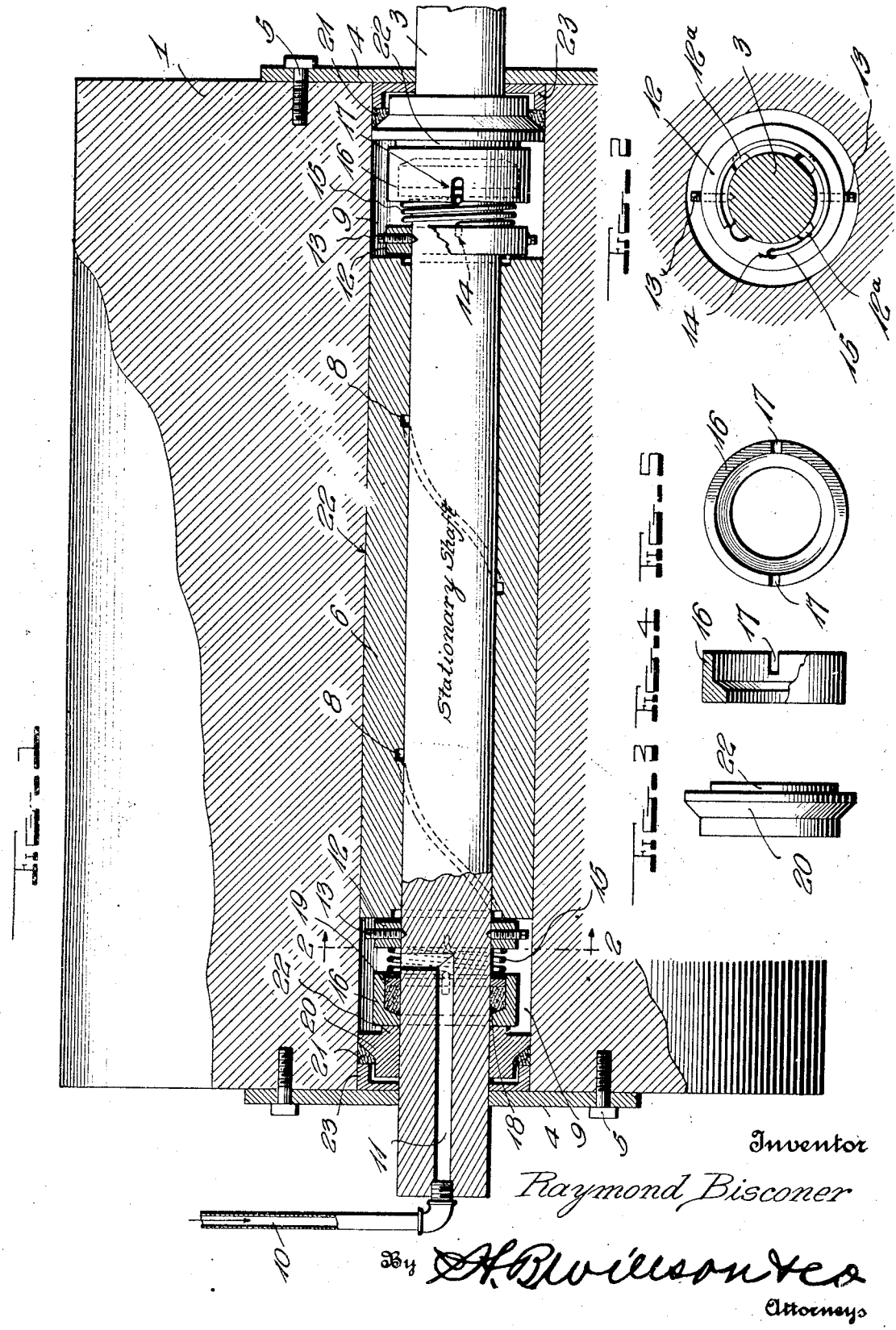

RAYMOND BISCONER, OF VISALIA, CALIFORNIA.

SELF-LUBRICATING BEARING.

1,329,948.     Specification of Letters Patent.     Patented Feb. 3, 1920.

Application filed July 28, 1919. Serial No. 313,669.

*To all whom it may concern:*

Be it known that I, RAYMOND BISCONER, a citizen of the United States, residing at Visalia, in the county of Tulare and State of California, have invented certain new and useful Improvements in Self-Lubricating Bearings; and I do declare the following to be a full, clear, and exact description of the invention, such as will enable others skilled in the art to which it appertains to make and use the same.

My invention relates to improvements in self-lubricating bearings.

The principal object of the invention is to construct a device of the above mentioned character which is especially adapted to be used on underwater pulleys, such as are used on bucket lines of dredgers, which will exclude all water, sand, silt and other extraneous matters, which tend to wear and injure the parts of the bearing.

Another object of the invention is to construct a device of the above mentioned type which is simple and effective, strong, durable and inexpensive to manufacture.

Other objects and advantages of the invention will be apparent during the course of the following description.

In the accompanying drawings forming a part of this specification and in which like numerals are employed to designate like parts throughout the same, Figure 1 is a sectional view of my improved bearing, some of the parts being shown in elevation.

Fig. 2 is a view taken on the line 2—2 of Fig. 1.

Figs. 3, 4 and 5 are detail views of the oil-seal rings.

In the drawings, wherein for the purpose of illustration is shown a preferred embodiment of my invention, the numeral 1 designates a rotatable member, preferably in the form of a pulley, which is provided with a longitudinal bore 2 of uniform diameter extending from end to end of the same. Extending through the bore 2 of the pulley is a stationary shaft 3 upon which the pulley is rotated. Water excluding plates 4 are secured to the ends of the pulley by any suitable means, such for example, screw-bolts 5. These plates 4 are provided with central openings therein which are adapted to support the ends of the shaft 3 which extend through the openings.

A bushing 6, which is preferably constructed of bronze or other similar metal, is fitted snugly within the bore 2 of the pulley and is adapted to rotate with the pulley. This bushing is provided on its inner face with an oil passage 8, preferably in the form of a spiral groove which extends from end to end of the same and which permits the oil to pass from a chamber at one end of the bore 2 to a chamber at the opposite end of the bore. The bushing as shown, is substantially shorter than the length of the pulley and has its ends spaced from the inner faces of the plates 4, thereby forming chambers 9 which are adapted to contain a lubricant, by which the parts are kept oiled.

The lubricant, which is preferably under pressure, is supplied through a pipe 10 communicating with a longitudinal boring 11 in one end of the stationary shaft 3. As shown, this bore 11 has a short transverse section which communicates with the chamber 9, thereby supplying oil to one of the chambers.

In order to insure against leakage of the oil from the chambers 9, and also prevent entrance of sand, silt and other extraneous matter into the chambers, I provide a series of spring pressed packings and oil-seal rings which are normally pressed outward against the inner faces of the plates 4 and held in tight contact with one another, thus preventing the escape of oil between them.

In carrying out this feature I preferably employ thrust collars 12 which are provided with passages 12ª therethrough. These collars surround the shaft 3 adjacent the opposite ends of the bushing 6 and are secured thereto by means of set-screws 13. I also provide an aperture 14 in the face of these collars 12 to receive the bent ends of the coil springs 15, and properly hold the springs in position. Slightly in front of the collars 12, and slidably mounted on the shaft 3, are cup-shaped oil-seal rings 16. These rings are provided at their opposite sides with notches 17 which are adapted to receive the opposite bent ends of the coil springs 15. Within these cup-shaped rings 16 are braided packing rings 18, the same being held from displacement by washers 19 which are placed in the open faces of the oil-seal rings 16.

Abutting the closed faces of the oil-seal rings 16 is a second pair of oil-seal rings 20. These rings 20 surround the shaft 3 and, as shown, have substantially beveled peripheries, upon which are seated a second set of braided packing rings 21. These oil-seal rings 20 have annular projecting faces 22 which bear against the closed faces of the first named oil-seal rings 16. In order to tightly seat the packing rings 21 on the beveled peripheries of the members 20 I provide cup-shaped collars 23, one side of which bears against plates 4 and the flanges of which bear against the packing rings 21, thus holding the packings tightly in place.

The abutting faces of the members 16 and 20 are highly polished and frictionally engage one another, thus insuring a tight oil-seal between themselves and the shaft 3.

It should be noted that the parts 6, 20, 21 and 23 which are fitted snugly in the bore of the pulley 1, rotate with the pulley. On the other hand, the parts 12, 15, 16 and 18, which are mounted on the shaft 3 are stationary therewith. Hence, it will be seen the packings 18 and 23, which are ordinarily subject to wear and which in time allow the leakage of oil from the bearings, are thus prevented from wear and the possibility of leakage reduced to a great extent. This construction, therefore, transfers the point of wear to the contacting faces of the members 16 and 20 which are constructed of metal and will stand a great amount of wear before causing leakage between themselves. As the respective contact faces of these members become worn, the springs 15 will automatically move them into tight contact with each other, and at the same time compress the packing rings. After the packings are compressed and the members 16—20 in frictional contact with each other, there will be little or no possibility of the oil escaping from the chambers 9.

Although the bearing as shown is especially designed for use in connection with slow speed pulleys for operation under water, it is to be understood that it is also applicable to various other types of bearings.

For installation of my device on revolving shaft bearings, or pulleys that revolve with the shaft it will be readily seen that the operation and assembly of parts should be merely reversed.

It is to be understood that the form of my invention herein shown and described is to be taken as a preferred example of the same, and that various changes in the shape, size and arrangement of parts may be resorted to without departing from the spirit of the invention or the scope of the subjoined claims.

Having thus described my invention, what I claim is:

1. The combination of a rotatable member having an axial bore of uniform diameter, a stationary shaft of less diameter than the axial bore of the rotatable member, said shaft having an oil passage in one end thereof, plates secured to the ends of the rotatable member having openings for the passage of the shaft therethrough, a bushing having an oil passage on its inner face fitted in the bore of the rotatable member and having rotatable engagement with the rotatable member, said bushing being of shorter length than the rotatable member and having its ends spaced from the retaining plates to form oil chambers, and spring pressed oil-seal members within the chamber to prevent leakage of the oil from the chambers.

2. The combination of a rotatable member having an axial bore of uniform diameter, a stationary shaft of less diameter than the axial bore of the rotatable member, said shaft having an oil passage in one end thereof, plates secured to the ends of the rotatable member having openings for the passage of the shaft therethrough, a bushing having an oil passage on its inner face fitted in the bore of the rotatable member and having rotatable engagement with the rotatable member, said bushing being of shorter length than the rotatable member and having its ends spaced from the retaining plates to form oil chambers, thrust collars fixed to said stationary shaft adjacent the ends of the bushing, slidable frictionally engaged oil-seal rings, and means to hold said rings in frictional engagement with one another.

3. A pulley for operation under water comprising a rotatable member having a longitudinal bore therethrough, a stationary shaft extending through said bore, end plates secured to the rotatable member, a bushing having its ends spaced from the plates to form chambers, thrust collars surrounding the shaft adjacent the ends of the bushings, slidable frictionally engaged oil-seal rings, the one ring being fixed to the rotatable member and the other ring being fixed to the stationary shaft, and means to hold said rings in frictional engagement to prevent the leakage of oil between them.

4. A self-lubricating bearing for operation under water comprising inner and outer members having relative rotative relationship, an oil chamber disposed between said inner and outer members, a plate closing the outer end of the chamber, a thrust collar fixed to the inner member, oil-seal rings disposed between the thrust collar and the plate, packing rings, one of which is adjacent the outer member and one of the oil-seal rings and the other of which is between the inner member and the other oil-seal ring, and means for simultaneously compressing the packing rings and holding the oil-seal rings in frictional engagement, thus preventing the escape of oil from the chamber.

In testimony whereof I have hereunto set my hand.

RAYMOND BISCONER.